United States Patent
Kojima et al.

(10) Patent No.: US 8,623,958 B2
(45) Date of Patent: Jan. 7, 2014

(54) OIL-IN-WATER SILICONE EMULSION COMPOSITION

(75) Inventors: Kazuhiko Kojima, Ichihara (JP); Tsutomu Naganawa, Ichihara (JP)

(73) Assignee: Dow Corning Toray Co. Ltd., Chiyoda-ku, Tokyo (JP)

( * ) Notice: Subject to any disclaimer, the term of this patent is extended or adjusted under 35 U.S.C. 154(b) by 222 days.

(21) Appl. No.: 13/255,618

(22) PCT Filed: Mar. 5, 2010

(86) PCT No.: PCT/JP2010/054268
§ 371 (c)(1),
(2), (4) Date: Sep. 9, 2011

(87) PCT Pub. No.: WO2010/104186
PCT Pub. Date: Sep. 16, 2010

(65) Prior Publication Data
US 2012/0004354 A1    Jan. 5, 2012

(30) Foreign Application Priority Data
Mar. 10, 2009    (JP) .................. 2009-057085

(51) Int. Cl.
C08L 83/06    (2006.01)
(52) U.S. Cl.
USPC ....................................... 524/860
(58) Field of Classification Search
USPC ....................................... 524/860
See application file for complete search history.

(56) References Cited

U.S. PATENT DOCUMENTS

| | | | |
|---|---|---|---|
| 2,891,920 A | 6/1959 | Hyde et al. |
| 3,294,725 A | 12/1966 | Findlay et al. |
| 3,419,593 A | 12/1968 | Willing |
| 3,445,420 A | 5/1969 | Kookootsedes et al. |
| 3,715,334 A | 2/1973 | Karstedt |
| 3,814,730 A | 6/1974 | Karstedt |
| 3,819,530 A | 6/1974 | Ratledge et al. |
| 3,839,388 A | 10/1974 | Nitzsche et al. |
| 3,923,705 A | 12/1975 | Smith |
| 3,989,667 A | 11/1976 | Lee et al. |
| 4,221,688 A | 9/1980 | Johnson et al. |
| 4,311,695 A | 1/1982 | Starch |
| 4,312,801 A | 1/1982 | Hiriart Bodin et al. |
| 4,404,035 A | 9/1983 | Ona et al. |
| 4,427,811 A | 1/1984 | Elias et al. |
| 4,564,693 A | 1/1986 | Riederer |
| 4,614,758 A | 9/1986 | Schwabe et al. |
| 4,701,490 A | 10/1987 | Burkhardt et al. |
| 4,725,658 A | 2/1988 | Thayer et al. |
| 4,769,405 A | 9/1988 | Kondo et al. |
| 4,788,001 A | 11/1988 | Narula |
| 4,990,556 A | 2/1991 | Shimizu et al. |
| 4,990,561 A | 2/1991 | Yoshioka |
| 5,035,832 A | 7/1991 | Takamura et al. |
| 5,039,724 A | 8/1991 | Demlehner et al. |
| 5,110,865 A | 5/1992 | Ona et al. |
| 5,133,897 A | 7/1992 | Balzer |
| 5,175,325 A | 12/1992 | Brown et al. |
| 5,189,102 A | 2/1993 | Tsubuko et al. |
| 5,262,087 A | 11/1993 | Tachibana et al. |
| 5,300,608 A * | 4/1994 | Chu et al. .................. 528/14 |
| 5,403,909 A | 4/1995 | Rubinsztajn |
| 5,434,215 A | 7/1995 | Sankaran et al. |
| 5,457,220 A | 10/1995 | Razzano |
| 5,503,755 A | 4/1996 | Danner |
| 5,504,150 A | 4/1996 | Gilson et al. |
| 5,603,940 A | 2/1997 | Candau et al. |
| 5,633,303 A | 5/1997 | Kondo et al. |
| 5,830,483 A | 11/1998 | Seidel et al. |
| 5,861,451 A | 1/1999 | Schroeder et al. |
| 5,888,485 A | 3/1999 | O'Lenick, Jr. et al. |
| 5,914,362 A | 6/1999 | Brecht et al. |
| 5,925,469 A | 7/1999 | Gee et al. |
| 5,973,068 A | 10/1999 | Yamaya et al. |
| 5,994,459 A | 11/1999 | Berg et al. |
| 6,001,928 A | 12/1999 | Harkness et al. |
| 6,054,548 A | 4/2000 | Currie et al. |

(Continued)

FOREIGN PATENT DOCUMENTS

| CN | 1230547 | 10/1996 |
|---|---|---|
| CN | 101073537 A | 11/2007 |

(Continued)

OTHER PUBLICATIONS

English language abstract for CN 101073537 extracted from the espacenet.com database on Apr. 16, 2013, 25 pages.

(Continued)

*Primary Examiner* — Kuo-Liang Peng
(74) *Attorney, Agent, or Firm* — Howard & Howard Attorneys PLLC

(57) ABSTRACT

An oil-in-water silicone emulsion composition comprising (A) 100 mass parts of a polyorganosiloxane that contains in each molecule at least two silicon-bonded hydroxyl or hydrolyzable groups, (B) 0.1 to 200 mass parts of a colloidal silica, (C) 1 to 100 mass parts of an ionic emulsifying agent, (D) 0.1 to 50 mass parts of a polyoxyethylene-polyoxypropylene copolymer-type nonionic emulsifying agent, and (E) 10 to 200 mass parts water. Such oil-in-water silicone emulsion composition exhibits an excellent storage stability, contains little low molecular weight silicone, and can form, even without the use of a tin catalyst, a cured film that exhibits a satisfactory elasticity, through the removal of the water fraction.

11 Claims, No Drawings

(56) References Cited

U.S. PATENT DOCUMENTS

| | | |
|---|---|---|
| 6,258,891 B1 | 7/2001 | Hoxmeier |
| 6,328,983 B1 | 12/2001 | Afriat |
| 6,362,280 B1 | 3/2002 | Lences et al. |
| 6,448,196 B1 | 9/2002 | Eglin et al. |
| 6,468,513 B1 | 10/2002 | Murphy et al. |
| 6,737,444 B1 | 5/2004 | Liu |
| 7,041,088 B2 | 5/2006 | Nawrocki et al. |
| 2003/0191244 A1 | 10/2003 | Yu |
| 2004/0210074 A1 | 10/2004 | Hupfield et al. |
| 2005/0143282 A1 | 6/2005 | Creutz et al. |
| 2007/0269390 A1 | 11/2007 | Inoue |
| 2008/0114143 A1 | 5/2008 | Brothers et al. |
| 2009/0042043 A1 | 2/2009 | Joseph et al. |
| 2009/0114327 A1 | 5/2009 | Breunig |
| 2009/0215944 A1 | 8/2009 | Maton et al. |
| 2010/0093598 A1 | 4/2010 | Davio et al. |
| 2010/0137454 A1 | 6/2010 | Barmes et al. |
| 2012/0027708 A1 | 2/2012 | Durand et al. |
| 2012/0077729 A1 | 3/2012 | Davio et al. |

FOREIGN PATENT DOCUMENTS

| | | |
|---|---|---|
| CN | 101247934 A | 8/2008 |
| EP | 0200916 A2 | 11/1986 |
| EP | 0215470 A2 | 3/1987 |
| EP | 0382365 A2 | 8/1990 |
| EP | 0722972 A1 | 7/1996 |
| EP | 0736562 A2 | 10/1996 |
| EP | 0802231 A2 | 10/1997 |
| EP | 0842974 A1 | 5/1998 |
| EP | 1029897 A1 | 8/2000 |
| EP | 1314415 A1 | 5/2003 |
| EP | 1447423 A1 | 8/2004 |
| EP | 1466935 A1 | 10/2004 |
| EP | 1557435 A1 | 7/2005 |
| EP | 1671673 A1 | 6/2006 |
| GB | 895091 A | 5/1962 |
| GB | 918823 A | 2/1963 |
| GB | 2056473 A | 3/1981 |
| GB | 2252975 A | 8/1992 |
| JP | 56-016553 A | 2/1981 |
| JP | 59-152972 A | 8/1984 |
| JP | 06-073291 A | 3/1994 |
| JP | H08-325456 A | 12/1996 |
| JP | 09-165554 A | 6/1997 |
| JP | 10-168393 A | 6/1998 |
| JP | 11-193349 A | 7/1999 |
| JP | 11-222554 A | 8/1999 |
| JP | 2000-026726 | 1/2000 |
| JP | 2002-088243 | 3/2002 |
| JP | 2006-515383 A | 5/2006 |
| WO | WO 01/25389 A1 | 4/2001 |
| WO | WO 01/49774 A2 | 7/2001 |
| WO | WO 01/49789 A2 | 7/2001 |
| WO | WO 01/79330 A1 | 10/2001 |
| WO | WO 03/082356 A2 | 10/2003 |
| WO | WO 2004/084844 A2 | 10/2004 |
| WO | WO 2005/016998 A2 | 2/2005 |
| WO | WO 2006/106362 A1 | 10/2006 |
| WO | WO 2008/043512 A2 | 4/2008 |
| WO | WO 2008/045427 A1 | 4/2008 |
| WO | WO 2008/090458 A1 | 7/2008 |
| WO | WO 2008/110590 A1 | 9/2008 |
| WO | WO 2010/104185 A2 | 9/2010 |
| WO | WO 2010/115782 A2 | 10/2010 |

OTHER PUBLICATIONS

English language abstract for CN 101247934 extrcted from espacenet.com database on Apr. 16, 2013. Also, see English language equivalent US 2009/0114327. Orginal document extracted from the espacenet.com database on Apr. 16, 2013, 24 pages.

Edens et al., "Applications of Block Copolymer Surfactants", Development in Block Copolymer Science and Technology, Wiley, US, Jan. 1, 2004, pp. 326-340.

Holmberg, "Applications of block copolymers", Jan. 1, 2000, Amphiphilic Block Copolymers self-assembly and applications, 15 pages.

English language abstract for JP 2002-088243 extracted from the Searching PAJ database on Apr. 16, 2013, along with Machine Translation, 36 pages.

English language abstract and translation for JP 06-073291 extracted from the PAJ database on Feb. 10, 2012, 42 pages.

English language abstract and translation for JP 09-165554 extracted from the PAJ database on Feb. 10, 2012, 29 pages.

English language abstract and translation for JP 10-168393 extracted from the PAJ database on Feb. 10, 2012, 38 pages.

English language abstract and translation for JP 11-193349 extracted from the PAJ database on Feb. 10, 2012, 31 pages.

English language abstract for JP 59-152972 extracted from the espacenet.com database on Feb. 10, 2012, 6 pages.

International Search Report for Application No. PCT/JP2010/054267 dated Sep. 30, 2010, 3 pages.

International Search Report for Application No. PCT/JP2010/054268 dated Oct. 4, 2010, 3 pages.

English language abstract for EP 0215470 extracted from the espacenet.com database on Jul. 8, 2013, 14 pages.

English language abstract not available for JP H08-325456; however, see English language equivalent US 5,504,150. Orginal document extracted from the espacenet.com database on Jul. 8, 2013, 12 pages.

English language abstract and machine-assisted English translation for JP 11-222554 extracted from the PAJ database on Jul. 8, 2013, 36 pages.

English language abstract not available for JP 2006-515383; however, see English language equivalent US 6,737,444. Original document extracted from the espacenet.com database on Jul. 8, 2013, 15 pages.

English language abstract for EP 1671673 extracted from the espacenet.com database on Mar. 7, 2012, 30 pages.

English language abstract and translation for JP 2000-026726 extracted from the PAJ database on Mar. 7, 2012, 40 pages.

\* cited by examiner

OIL-IN-WATER SILICONE EMULSION COMPOSITION

RELATED APPLICATIONS

This application claims priority to and all the advantages of International Patent Application No. PCT/JP2010/054268, filed on Mar. 5, 2010, which claims priority to Japanese Patent Application No. JP2009-057085, filed on Mar. 10, 2009.

TECHNICAL FIELD

The present invention relates to an oil-in-water silicone emulsion composition and more particularly relates to an oil-in-water silicone emulsion composition that contains colloidal silica and that has an excellent storage stability. The present invention even more particularly relates to an oil-in-water silicone emulsion composition that contains colloidal silica, that has an excellent storage stability, and that, even without the use of a tin catalyst, is converted into a silicone elastomer through the removal of the water fraction and thereby forms a cured film that exhibits a satisfactory strength, i.e., a satisfactory rubbery elasticity, and a satisfactory adherence to substrate.

BACKGROUND ART

Oil-in-water silicone emulsion compositions that through the removal of the water fraction form a water-repellent, stain-resistant, and heat-resistant cured film that exhibits mold releasability and peeling releasability are used in paints, paper coating agents, mold release agents, peeling release agents, fiber treatment agents, cosmetics, and so forth. There has been demand in recent years for an oil-in-water silicone emulsion composition that does not employ a tin catalyst as the curing catalyst, and this has led to the appearance of a composition comprising a hydroxyl-containing diorganosiloxane, a silicone resin, and an aminoxy group-terminated diorganosiloxane (refer to JP 06-073291 A) and a composition provided by the mixing and subsequent emulsification of a hydroxyl-containing diorganosiloxane and, as a crosslinking agent, a compound selected from linear siloxanes that have the aminoxy group in side chain position, cyclic aminoxysiloxanes, aminoxysilanes, and the partial hydrolysis products of the preceding (refer to JP 11-193349 A). However, these compositions have had the problems of an inadequate strength on the part of the cured film and/or an inadequate adherence to substrate by the cured film.

Oil-in-water silicone emulsion compositions that contain colloidal silica have been introduced in order to solve these problems (refer to JP 56-016553 A, JP 59-152972 A, JP 09-165554 A, and JP 10-168393 A).

However, based on storage stability considerations, the prior colloidal silica-containing oil-in-water silicone emulsion compositions have contained a polyorganosiloxane whose degree of polymerization has been increased by the emulsion polymerization during emulsion production of octamethylcyclotetrasiloxane and/or decamethylcyclopentasiloxane using a strong acid or strong base as the polymerization catalyst. A problem with these oil-in-water silicone emulsion compositions has been the presence of large amounts of siloxane oligomers, e.g., octamethylcyclotetrasiloxane, decamethylcyclopentasiloxane, and so forth, in the final product. This problem is due to the simultaneous occurrence of siloxane bond cleavage reactions during the emulsion polymerization with the production of new low molecular weight polyorganosiloxanes. Due to the volatility of siloxane oligomers such as octamethylcyclotetrasiloxane, decamethylcyclopentasiloxane, and so forth, these oil-in-water silicone emulsions have had the problem of not being usable depending on the particular application.

PRIOR ART REFERENCES

Patent References

Patent Reference 1: JP 06-073291 A
Patent Reference 2: JP 11-193349 A
Patent Reference 3: JP 56-016553 A
Patent Reference 4: JP 59-152972 A
Patent Reference 5: JP 09-165554 A
Patent Reference 6: JP 10-168393 A

DISCLOSURE OF INVENTION

An object of the present invention is to provide an oil-in-water silicone emulsion composition that has an excellent storage stability, that contains little volatile siloxane oligomer, and that, through the removal of the water fraction and even without the use of a tin catalyst, is able to form a cured film that exhibits rubbery elasticity and a satisfactory adherence to substrate.

The oil-in-water silicone emulsion composition of the present invention characteristically comprises (A) 100 mass parts of a polyorganosiloxane that contains in each molecule at least two silicon-bonded hydroxyl or hydrolyzable groups, (B) 0.1 to 200 mass parts of a colloidal silica, (C) 1 to 100 mass parts of an ionic emulsifying agent, (D) 0.1 to 50 mass parts of a polyoxyethylene-polyoxypropylene copolymer-type nonionic emulsifying agent, and (E) 10 to 200 mass parts water. The total content of siloxane oligomers comprising 4 to 5 siloxane units in the oil-in-water silicone emulsion composition of the present invention is preferably not more than 2%.

The aforementioned component (A) polyorganosiloxane is preferably a diorganopolysiloxane endblocked at both molecular chain terminals by the hydroxyl group and more preferably has a viscosity at 25° C. from 50 mPa·s to 2,000,000 mPa·s.

The oil-in-water silicone emulsion composition of the present invention preferably additionally incorporates, as a component (F), 0.1 to 50 mass parts of an alkoxysilane or alkoxyalkoxysilane represented by $R_a SiX_{4-a}$ wherein R is an unsubstituted monovalent hydrocarbyl group or a substituted monovalent hydrocarbyl group, X is an alkoxy group or an alkoxyalkoxy group, and a is 0, 1, or 2, or a partial hydrolysis and condensation product of the aforementioned alkoxysilane or alkoxyalkoxysilane.

The oil-in-water silicone emulsion composition of the present invention also preferably additionally incorporates an amine as a component (G). The average particle size of the emulsion particles in the oil-in-water silicone emulsion composition of the present invention is preferably not more than 300 nm.

The method of producing the oil-in-water silicone emulsion composition of the present invention characteristically comprises the steps of: carrying out emulsification and dispersion on the (A) polyorganosiloxane that contains in each molecule at least two silicon-bonded hydroxyl or hydrolyzable groups, the (C) ionic emulsifying agent, the (D) polyoxyethylene-polyoxypropylene copolymer-type nonionic emulsifying agent, and a portion of the (E) water; and incorporating the (B) colloidal silica and the remainder of the (E) water in the emulsion provided by the preceding step.

The surface treatment method of the present invention is characterized by carrying out a surface treatment on the surface of a substrate with the oil-in-water silicone emulsion composition according to the present invention.

The oil-in-water silicone emulsion composition of the present invention can form a cured film through the removal of the water fraction and can do this without the use of a tin catalyst; moreover, due to the presence of the colloidal silica, the cured film that is formed has a satisfactory strength, i.e., a satisfactory rubbery elasticity, and a satisfactory adherence to substrate. An excellent storage stability and an excellent film formability are characteristically exhibited due to the use of the ionic emulsifying agent and the polyoxyethylene-polyoxypropylene copolymer-type nonionic emulsifying agent. In addition, since a polyorganosiloxane that has at least two silicon-bonded hydrolyzable groups in each molecule is emulsified and dispersed, the content of siloxane oligomer, e.g., octamethylcyclotetrasiloxane, decamethylcyclopentasiloxane, and so forth, is low and use in a broad range of applications is thereby made possible. The method of the present invention for producing the oil-in-water silicone emulsion composition of the present invention can efficiently produce this oil-in-water silicone emulsion composition. The method of the present invention for treating a surface can efficiently form a rubbery elastic cured silicone film on a wide variety of substrate surfaces.

BEST MODE FOR CARRYING OUT THE INVENTION

Component (A) is a polyorganosiloxane that contains at least two silicon-bonded hydroxyl or hydrolyzable groups in each molecule, and is the base component of the oil-in-water silicone emulsion of the present invention. The molecular structure of the component (A) polyorganosiloxane may be straight chain, cyclic, branched, dendritic, or network, but a straight chain or a partially branched straight chain is preferred. The hydroxyl or hydrolyzable groups may be present in terminal position on the molecular chain or in side chain position on the molecular chain or in both positions. The hydrolyzable group can be exemplified by the alkoxy group, alkoxyalkoxy group, acetoxy group, oxime group, enoxy group, amino group, aminoxy group, and amide group, wherein $C_{1-10}$ alkoxy, e.g., methoxy, ethoxy, n-propoxy, isopropoxy, n-butoxy, t-butoxy, hexyloxy, cyclohexyloxy, octyloxy, decyloxy, and so forth, and $C_{2-10}$ alkoxyalkoxy, e.g., methoxymethoxy, methoxyethoxy, ethoxymethoxy, methoxypropoxy, and so forth, are preferred.

Unsubstituted monovalent hydrocarbyl groups and substituted monovalent hydrocarbyl groups are examples of the silicon-bonded organic groups other than the hydroxyl or hydrolyzable groups. $C_{1-10}$ unsubstituted monovalent hydrocarbyl groups are preferred for the unsubstituted monovalent hydrocarbyl groups from the standpoint of the emulsification-boosting action: The unsubstituted monovalent hydrocarbyl can be exemplified by $C_{1-10}$ alkyl such as methyl, ethyl, n-propyl, isopropyl, butyl, t-butyl, hexyl, octyl, decyl, and so forth; $C_{3-10}$ cycloalkyl such as cyclopentyl, cyclohexyl, and so forth; $C_{2-10}$ alkenyl such as vinyl, allyl, 5-hexenyl, 9-decenyl, and so forth; $C_{6-10}$ aryl such as phenyl, tolyl, xylyl, and so forth; and $C_{7-10}$ aralkyl such as benzyl, methylbenzyl, phenethyl, and so forth. Preferred thereamong are the $C_{1-10}$ alkyl, $C_{6-10}$ aryl, and $C_{2-10}$ alkenyl, wherein methyl and phenyl are particularly preferred.

The substituted monovalent hydrocarbyl group can be exemplified by groups provided by replacing all or a portion of the hydrogen atoms in the aforementioned unsubstituted monovalent hydrocarbyl groups, and particularly in the $C_{1-10}$ alkyl and phenyl, with a halogen atom such as fluorine, chlorine, and so forth; an epoxy functional group such as glycidyloxy, epoxycyclohexyl, and so forth; a methacrylic functional group such as methacryloxy and so forth; an acrylic functional group such as acryloxy and so forth; an amino functional group such as the amino group, aminoethylamino, phenylamino, dibutylamino, and so forth; a sulfur-containing functional group such as the mercapto group, the tetrasulfide group, and so forth; or a substituent group such as alkoxy, hydroxycarbonyl, alkoxycarbonyl, and so forth.

The following are specific examples of the substituted monovalent hydrocarbyl group: 3,3,3-trifluoropropyl, perfluorobutylethyl, perfluorooctylethyl, 3-chloropropyl, 3-glycidoxypropyl, 2-(3,4-epoxycyclohexyl)ethyl, 5,6-epoxyhexyl, 9,10-epoxydecyl, 3-methacryloxypropyl, 3-acryloxypropyl, 11-methacryloxyundecyl, 3-aminopropyl, N-(2-aminoethyl)aminopropyl, 3-(N-phenylamino)propyl, 3-dibutylaminopropyl, 3-mercaptopropyl, 3-hydroxycarbonylpropyl, methoxypropyl, and ethoxypropyl.

The viscosity of component (A) at 25° C. is not particularly limited; however, taking into consideration the strength of the cured film provided by the oil-in-water silicone emulsion composition of the present invention, the handling characteristics during its production, and the particle size and stability during emulsification and dispersion, component (A) has a viscosity at 25° C. preferably of 50 mPa·s to 2,000,000 mPa·s, more preferably of 100 mPa·s to 500,000 mPa·s, and even more preferably of 500 mPa·s to 100,000 mPa·s.

Component (A) is preferably a diorganopolysiloxane that is endblocked at both molecular chain terminals by the hydroxyl group. Such a diorganopolysiloxane endblocked at both molecular chain terminals by the hydroxyl group can be exemplified by a polyorganosiloxane represented by the general formula $HO(R_2SiO)_mH$. R in this formula denotes the same silicon-bonded unsubstituted and substituted monovalent hydrocarbyl groups other than the hydroxyl or hydrolyzable groups as described above, wherein $C_{1-10}$ alkyl, $C_{6-10}$ aryl, and $C_{2-10}$ alkenyl are preferred and methyl and phenyl are particularly preferred. The subscript m is an integer with a value of at least 2 and preferably is a number that provides a viscosity at 25° C. from 50 mPa·s to 2,000,000 mPa·s.

The component (B) colloidal silica improves the strength of the cured film and improves the adherence of the cured film to substrate. Colloidal silica refers to silica particles that have been dispersed in water to provide a colloidal state; it has a silanol-rich surface and a particle size generally from about 1 nm to 1 μm. Colloidal silica can be exemplified by Snowtex 20, Snowtex 30, Snowtex 40, Snowtex C, Snowtex N, Snowtex O, Snowtex S, Snowtex 20L, Snowtex OL, Snowtex ST-XS, Snowtex ST-SS, Snowtex AK, and Snowtex BK from Nissan Chemical Industries, Ltd. These colloidal silicas are typically a 5 to 40 mass % dispersion in water. Component (B) is incorporated at preferably 0.1 to 200 mass parts and more preferably at 1 to 100 mass parts, in each case per 100 mass parts component (A).

The component (C) ionic emulsifying agent and component (D) polyoxyethylene-polyoxypropylene copolymer-type nonionic emulsifying agent bring about a stable emulsification in component (E) of component (A) and the optional component (F). Component (C) is incorporated at from 1 to 50 mass parts and preferably 1 to 20 mass parts, in each case per 100 mass parts component (A).

Anionic, cationic, and amphoteric surfactants can be used as the component (C) ionic emulsifying agent. A single type of surfactant may be used as the ionic emulsifying agent, or two or more surfactants of different type may be used in combination.

The anionic surfactant can be exemplified by alkylbenzenesulfonate salts, alkyl ether sulfate salts, polyoxyethylene alkyl ether sulfate salts, polyoxyethylene alkylphenyl ether sulfate salts, alkylnaphthylsulfonate salts, unsaturated aliphatic sulfonate salts, and hydroxylated aliphatic sulfonate salts. The alkyl group referenced here can be exemplified by medium and higher alkyl groups such as decyl, undecyl, dodecyl, tridecyl, tetradecyl, cetyl, stearyl, and so forth. The unsaturated aliphatic group can be exemplified by oleyl, nonenyl, and octynyl. The counterion can be exemplified by the sodium ion, potassium ion, lithium ion, and ammonium ion, with the sodium ion being typically used among these.

The cationic surfactant can be exemplified by quaternary ammonium salt-type surfactants such as alkyltrimethylammonium salts, e.g., octadecyltrimethylammonium chloride, hexadecyltrimethylammonium chloride, and so forth, and dialkyldimethylammonium salts, e.g., dioctadecyldimethylammonium chloride, dihexadecyldimethylammonium chloride, didecyldimethylammonium chloride, and so forth.

The amphoteric surfactant can be exemplified by alkylbetaines and alkylimidazolines.

The component (D) polyoxyethylene-polyoxypropylene copolymer-type nonionic emulsifying agent is generally a compound represented by the following general formula (1) or general formula (2).

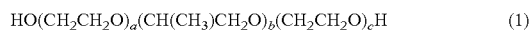

$$HO(CH_2CH_2O)_a(CH(CH_3)CH_2O)_b(CH_2CH_2O)_cH \quad (1)$$

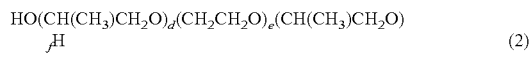

$$HO(CH(CH_3)CH_2O)_d(CH_2CH_2O)_e(CH(CH_3)CH_2O)_fH \quad (2)$$

a, b, c, d, e, and f in general formulas (1) and (2) indicate the average number of moles of addition of ethylene oxide or propylene oxide and are each independently a number from 1 to 350. The weight-average molecular weight of component (D) is preferably 1,000 to 18,000 and more preferably 1,500 to 10,000. When component (D) is a solid, it may also be used in the form of its aqueous solution. These compounds can be commercially acquired from the Adeka Corporation under the product names in the "Pluronic L" series, the "Pluronic P" series, the "Pluronic F" series, and the "Pluronic TR" series.

The amount of component (D) incorporation is 0.1 to 50 mass parts and preferably 1 to 20 mass parts, in each case per 100 mass parts component (A). It has been observed that component (D) acts cooperatively with component (C) to reduce the particle size of the emulsion particles.

The total of the quantities of incorporation of components (C) and (D) is generally preferably 1 to 30 mass % and more preferably 2 to 20 mass % of the total quantity of components (A) and the optionally incorporated (F). The ratio between the quantity of component (C) incorporation and the quantity of component (D) incorporation is preferably in the range from 3:1 to 100:1.

The component (E) water preferably does not contain a component that interferes with emulsification or that impairs the storage stability of the emulsion, and can be exemplified by ion-exchanged water, distilled water, well water, and tap water. Component (E) is used in an amount sufficient for maintaining a stable water-based emulsion state, but the quantity of incorporation is not otherwise particularly limited. However, component (E) is ordinarily incorporated at from 10 to 200 mass parts per 100 mass parts component (A).

Viewed from the perspective of improving the strength and adherence of the cured film, the oil-in-water silicone emulsion of the present invention preferably also contains (F) an alkoxysilane or alkoxyalkoxysilane represented by $R^1_aSiX_{4-a}$ or a partial hydrolysis and condensation product of such an alkoxysilane or alkoxyalkoxysilane. R in the formula is the same as previously described, among which $C_{1-10}$ alkyl, $C_{6-10}$ aryl, and $C_{2-10}$ alkenyl are preferred with methyl and phenyl being particularly preferred. X is preferably a $C_{1-10}$ alkoxy group or a $C_{2-10}$ alkoxyalkoxy group, and the same groups as previously described are examples here. a is 0, 1, or 2 and is preferably 0 or 1.

Specific examples of preferred alkoxysilanes are tetraalkoxysilanes such as tetraethoxysilane, tetrapropoxysilane, and so forth; alkyltrialkoxysilanes such as methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, hexyltrimethoxysilane, octyltriethoxysilane, tetradecyltriethoxysilane, and so forth; substituted alkyltrialkoxysilanes as provided by replacing a portion of the hydrogen atoms on the alkyl in the preceding alkyltrialkoxysilanes with, for example, the methacryloxy group, glycidoxy group, amino group, and so forth; alkenyltrialkoxysilanes such as vinyltrimethoxysilane, vinyltriethoxysilane, and so forth; aryltrialkoxysilanes such as phenyltrimethoxysilane, phenyltriethoxysilane, and so forth; and substituted alkyltrialkoxysilanes such as γ-methacryloxypropyltrimethoxysilane, γ-glycidoxypropyltrimethoxysilane, γ-glycidoxypropyltriethoxysilane, N-(β-aminoethyl)-γ-aminopropyltrimethoxysilane, N-(β-aminoethyl)-γ-aminopropyltriethoxysilane, γ-aminopropyltriethoxysilane, 2-amino-1-methylethyltriethoxysilane, N-methyl-γ-aminopropyltriethoxysilane, and so forth.

Specific examples of preferred alkoxyalkoxysilanes are tetraalkoxyalkoxysilanes such as tetramethoxymethoxysilane, tetraethoxyethoxysilane, tetramethoxyethoxysilane, tetraethoxymethoxysilane, and so forth; alkyltrialkoxyalkoxysilanes such as methyltrimethoxymethoxysilane, methyltriethoxyethoxysilane, methyltrimethoxyethoxysilane, methyltriethoxymethoxysilane, ethyltrimethoxymethoxysilane, ethyltriethoxyethoxysilane, ethyltrimethoxyethoxysilane, ethyltriethoxymethoxysilane, hexyltrimethoxyethoxysilane, octyltrimethoxyethoxysilane, tetradecyltrimethoxyethoxysilane, and so forth; substituted alkyltrialkoxyalkoxysilanes as provided by replacing a portion of the hydrogen atoms on the alkyl in the aforementioned alkyltrialkoxyalkoxysilanes with, for example, the methacryloxy group, glycidoxy group, amino group, and so forth; alkenyltrialkoxyalkoxysilanes such as vinyltrimethoxymethoxysilane, vinyltriethoxyethoxysilane, vinyltrimethoxyethoxysilane, vinyltriethoxymethoxysilane, and so forth; and aryltrialkoxyalkoxysilanes such as phenyltrimethoxymethoxysilane, phenyltriethoxyethoxysilane, phenyltrimethoxyethoxysilane, phenyltriethoxymethoxysilane, and so forth.

Tetraalkoxysilanes, alkyltrialkoxysilanes, tetraalkoxyalkoxysilanes, and alkyltrialkoxyalkoxysilanes are preferred among the preceding, while tetraalkoxysilanes and alkoxyalkoxysilanes are more preferred.

Component (F) may also be a partial hydrolysis and condensation product from the aforementioned organoalkoxysilanes, organoalkoxyalkoxysilanes, tetraalkoxysilanes, or tetraalkoxyalkoxysilanes.

Component (F) is preferably incorporated at 0.1 to 50 mass parts and more preferably at 1 to 15 mass parts, in each case per 100 mass parts component (A). The improvement in the strength of the cured film from the resulting water-based emulsion may be inadequate when the quantity of component (F) incorporation is less than 0.1 mass part per 100 mass parts component (A). Exceeding 50 mass parts is disfavored because the higher amount of alcohol by-product has ill effects on the environment and human body and because the cured film formability may change with the passage of time.

In addition, the oil-in-water silicone emulsion composition of the present invention may incorporate other components on an optional basis as appropriate, for example, a thickener, antifoaming agent, penetrating agent, antistatic agent, inorganic powder, preservative, silane coupling agent, pH adjusting agent, buffer, ultraviolet absorber, tin-free curing catalyst, water-soluble resin, organic resin emulsion, pigment, dye, and so forth.

Among the preceding, the incorporation of an amine compound (G) as a pH adjusting agent is preferred. The amine compound can be exemplified by diethylamine, ethylenediamine, butylamine, hexylamine, morpholine, monoethanolamine, triethylamine, triethanolamine, dipropanolamine, and 2-amino-2-methyl-2-propanol, wherein diethylamine is preferred among the preceding. The quantity of incorporation of component (G) as the pH adjusting agent is preferably in the range from 0.01 to 5 mass % and is more preferably in the range from 0.1 to 2 mass %.

The oil-in-water silicone emulsion composition of the present invention can be produced by a production method comprising the steps of (I): carrying out emulsification and dispersion on components (A), (C), and (D) and a portion of component (E), using an emulsifying device such as, for example, a homomixer, homogenizer, colloid mill, Combi mixer, inline-type continuous emulsifying device, vacuum emulsifying device, ultrasound emulsifying device, continuous mixing apparatus, and so forth; and (II): incorporating and dispersing component (B) and the remainder of component (E) in the emulsion provided by the preceding step. Component (F) may optionally be incorporated in either step or may be subdivided and incorporated in each step. Viewed from the perspective of the storage stability and the cured film formability, the average particle size of the emulsion particles is preferably not more than 300 nm and is more preferably not more than 250 nm. The average particle size of the emulsion particles can be measured, for example, by a dynamic light scattering procedure.

The total content of siloxane oligomers comprising 4 to 5 siloxane units is preferably not more than 2 mass % in the oil-in-water silicone emulsion composition of the present invention and more preferably is not more than 1 mass % and even more preferably is not more than 0.5 mass %. The siloxane oligomers comprising 4 to 5 siloxane units can be exemplified by tetrameric to pentameric cyclic siloxane oligomers such as octaorganotetracyclosiloxane, decaorganopentacyclosiloxane, and so forth, and by tetrameric to pentameric straight-chain siloxane oligomers such as a tetraorganodisiloxane endblocked at both molecular chain terminals by a hydroxydiorganosiloxy group, a hexaorganotrisiloxane endblocked at both molecular chain terminals by a hydroxydiorganosiloxy group, and so forth. The siloxane oligomer content in the oil-in-water silicone emulsion composition of the present invention can be measured by gas chromatography.

The surface treatment method of the present invention characteristically comprises carrying out a surface treatment on the surface of a substrate with the oil-in-water silicone emulsion composition of the present invention. The substrate can be exemplified by metals, ceramics, concrete, paper, fibers, plastics, glass, and rubber.

The method of carrying out a surface treatment on the surface of a substrate with the aforementioned oil-in-water silicone emulsion composition preferably comprises (I) a step of coating the surface of the substrate with the oil-in-water silicone emulsion composition and (II) a step of removing the water in the oil-in-water silicone emulsion composition on the substrate surface to form a cured film on the substrate surface. The specific procedure for carrying out step (I) can be exemplified by spraying, dipping, gravure coating, knife coating, and so forth. The water removal in step (II) can be carried out by air drying by standing at ambient temperature; or by standing at an ambient temperature adjusted to 20 to 200° C.; or by exposure to infrared radiation, ultraviolet radiation, or other high energy radiation.

EXAMPLES

The present invention is particularly described herebelow by examples and comparative examples. The viscosity in the examples is the value measured at 25° C.; the parts used to indicate the amount of incorporation denotes mass parts; and the % used to indicate content denotes mass %. In the formulas, Me refers to the methyl group and Et refers to the ethyl group.

The average particle size of the emulsion particles was measured by dynamic light scattering using a submicron particle analyzer (Coulter Model N4 MD from Coulter Electronics, Inc.) at 25° C. and was determined by monodispersion mode analysis.

The strength of the cured film and its adherence to a glass panel were evaluated by coating the emulsion composition on a glass panel; removing the water fraction by holding for one day at 25° C.; and then touching with a finger. With regard to the strength of the cured film, this was evaluated by touching with a finger to determine whether the cured film was adequately cured and exhibited rubbery elasticity. When elasticity was observed for the cured film, the film was also strongly rubbed with a finger to determine whether plastic deformation was seen. With regard to the adherence by the cured film to the glass panel, this was evaluated by rubbing the cured film strongly with a finger and checking whether peeling from the glass panel occurred.

The total content of siloxane oligomers comprising 4 to 5 siloxane units in the prepared oil-in-water silicone emulsion was measured by weighing out a 1.0 g sample; adding 5 mL methanol, 10 mL hexane, and 10 μL n-undecane and stirring for several minutes; thereafter holding at quiescence overnight and then adding 5 mL ultrapure water taking care to avoid disturbance; and subsequently recovering the hexane layer and performing the measurement with a gas chromatograph (GC-2010 from Shimadzu).

Example 1

50.0 parts of a polydimethylsiloxane endblocked at both molecular chain terminals by the hydroxydimethylsiloxy group and having a viscosity of 2,400 mPa·s was mixed with 1.0 part tetraethoxysilane. This was followed by the addition of 8.0 parts of a 70% aqueous solution of sodium polyoxyethylene (2 mol) lauryl ether sulfate, 1.0 part polyoxyethylene-polyoxypropylene copolymer-type nonionic emulsifying agent (product name: Pluronic F68, from Adeka Corporation), and 3.0 parts water and mixing and then emulsification using a continuous mixing apparatus. After dilution with 19.0 parts water and 16.5 parts colloidal silica (trade name: Snowtex C, from Nissan Chemical Industries, Ltd., effective component=20%), 1.5 parts of an aqueous solution provided by diluting 0.5 part diethylamine as a pH adjusting agent with 1.0 part water was added, thus producing an oil-in-water silicone emulsion. The average particle size of the emulsion particles in the obtained oil-in-water silicone emulsion was 190 nm; the siloxane oligomers comprising 4 to 5 siloxane units were octamethyltetracyclosiloxane and decamethylpentacyclosiloxane; and their content was 0.12%. When the obtained oil-in-water silicone emulsion was held at 25° C., phenomena such as separation were not seen even after 6 months and the dispersion status was stable. A satisfactory adherence and rubbery elasticity were seen when the obtained oil-in-water silicone emulsion was coated three days after its preparation on a glass panel and the status of the cured film was evaluated. In addition, plastic deformation was not seen even when the surface of the cured film was forcefully rubbed with a finger.

Example 2

An emulsion was prepared as in Example 1, but in this case using methyltriethoxysilane rather than the tetraethoxysilane used in Example 1. The average particle size of the emulsion particles in the obtained oil-in-water silicone emulsion was 200 nm; the siloxane oligomers comprising 4 to 5 siloxane units were octamethyltetracyclosiloxane and decamethylpentacyclosiloxane; and their content was 0.12%. When the obtained oil-in-water silicone emulsion was held at 25° C., phenomena such as separation were not seen even after 6 months and the dispersion status was stable. A satisfactory adherence and rubbery elasticity were seen when the obtained oil-in-water silicone emulsion was coated three days after its preparation on a glass panel and the status of the cured film was evaluated. In addition, plastic deformation was not seen even when the surface of the cured film was forcefully rubbed with a finger.

Example 3

An emulsion was prepared as in Example 1, but in this case changing the polyoxyethylene-polyoxypropylene copolymer-type nonionic emulsifying agent used in Example 1 from Pluronic F68 from the Adeka Corporation to Pluronic P85 from the Adeka Corporation. The average particle size of the emulsion particles in the obtained oil-in-water silicone emulsion was 210 nm; the siloxane oligomers comprising 4 to 5 siloxane units were octamethyltetracyclosiloxane and decamethylpentacyclosiloxane; and their content was 0.12%. When the obtained oil-in-water silicone emulsion was held at 25° C., phenomena such as separation were not seen even after 3 months and the dispersion status was stable. A satisfactory adherence and rubbery elasticity were seen when the obtained oil-in-water silicone emulsion was coated five days after its preparation on a glass panel and the status of the cured film was evaluated. In addition, plastic deformation was not seen even when the surface of the cured film was forcefully rubbed with a finger.

Example 4

An emulsion was prepared as in Example 1, but in this case changing the polyoxyethylene-polyoxypropylene copolymer-type nonionic emulsifying agent used in Example 1 from Pluronic F68 from the Adeka Corporation to Pluronic F88 from the Adeka Corporation. The average particle size of the obtained emulsion particles was 180 nm; the siloxane oligomers comprising 4 to 5 siloxane units were octamethyltetracyclosiloxane and decamethylpentacyclosiloxane; and their content was 0.12%. When the obtained emulsion was held at 25° C., phenomena such as separation were not seen even after 5 months and the dispersion status was stable. A satisfactory adherence and rubbery elasticity were seen when the obtained emulsion composition was coated five days after its preparation on a glass panel and the status of the cured film was evaluated. In addition, plastic deformation was not seen even when the surface of the cured film was forcefully rubbed with a finger.

Example 5

6.4 parts of a 70% aqueous solution of sodium polyoxyethylene (2 mol) lauryl ether sulfate, 0.8 part polyoxyethylene-polyoxypropylene copolymer-type nonionic emulsifying agent (product name: Pluronic F68, from Adeka Corporation), and 2.0 parts water were introduced into a T. K. COMBI MIX (Tokushu Kika Kogyo Co., Ltd.) and were mixed. 40.0 parts polydimethylsiloxane endblocked at both molecular chain terminals by the hydroxydimethylsiloxy group and having a viscosity of 2,400 mPa·s and 0.8 part tetraethoxysilane were then introduced and emulsification was carried out for 3 hours. This was followed by the introduction of 22.1 parts water, 26.4 parts colloidal silica (trade name: Snowtex C, from Nissan Chemical Industries, Ltd., effective component=20%), and 1.5 parts of an aqueous solution provided by diluting 0.5 part diethylamine as a pH adjusting agent with 1.0 part water and mixing to produce an oil-in-water silicone emulsion. The average particle size of the obtained emulsion particles was 200 nm; the siloxane oligomers comprising 4 to 5 siloxane units were octamethyltetracyclosiloxane and decamethylpentacyclosiloxane; and their content was 0.10%. When the obtained emulsion was held at 25° C., phenomena such as separation were not seen even after 1 month and more and the dispersion status was stable. A satisfactory adherence and rubbery elasticity were seen when the obtained emulsion composition was coated seven days after its preparation on a glass panel and the status of the cured film was evaluated. In addition, plastic deformation was not seen even when the surface of the cured film was forcefully rubbed with a finger.

Example 6

An oil-in-water silicone emulsion was prepared as in Example 1, but in this case adding 1.0 part of the aminoxy group-containing siloxane with the following formula

prior to the emulsification with the continuous mixer in Example 1. The average particle size of the obtained emulsion particles was 190 nm; the siloxane oligomers comprising 4 to 5 siloxane units were octamethyltetracyclosiloxane and decamethylpentacyclosiloxane; and their content was 0.12%. When the obtained emulsion was held at 25° C., phenomena such as separation were not seen even after 6 months and the dispersion status was stable. A satisfactory adherence and rubbery elasticity were seen when the obtained emulsion composition was coated three days after its preparation on a glass panel and the status of the cured film was evaluated. In addition, plastic deformation was not seen even when the surface of the cured film was forcefully rubbed with a finger.

Example 7

An oil-in-water silicone emulsion was prepared as in Example 6, but in this case using methyltriethoxysilane rather than the tetraethoxysilane used in Example 6. The average particle size of the obtained emulsion particles was 220 nm; the siloxane oligomers comprising 4 to 5 siloxane units were octamethyltetracyclosiloxane and decamethylpentacyclosiloxane; and their content was 0.12%. When the obtained emulsion was held at 25° C., phenomena such as separation were not seen even after 3 months and the dispersion status was stable. A satisfactory adherence and rubbery elasticity were seen when the obtained oil-in-water silicone emulsion was coated three days after its preparation on a glass panel and the status of the cured film was evaluated. In addition, plastic deformation was not seen even when the surface of the cured film was forcefully rubbed with a finger.

Comparative Example 1

50.0 parts of a polydimethylsiloxane endblocked at both molecular chain terminals by the hydroxydimethylsiloxy group and having a viscosity of 4,000 mPa·s was mixed with 1.0 part tetraethoxysilane. This was followed by the addition of 4.57 parts of a 70% aqueous solution of sodium polyoxyethylene (2 mol) lauryl ether sulfate, 1.18 parts of an 85% aqueous solution of a polyoxyethylene branched decyl ether, and 3.0 parts water and mixing and then emulsification using a continuous mixing apparatus. After dilution with 5.8 parts water and 33.0 parts colloidal silica (trade name: Snowtex C, from Nissan Chemical Industries, Ltd., effective component=20%), 1.5 parts of an aqueous solution provided by diluting 0.5 part diethylamine as a pH adjusting agent with 1.0 part water was added, thus producing an oil-in-water silicone emulsion. The average particle size of the obtained emulsion particles was 300 nm; the siloxane oligomers comprising 4 to 5 siloxane units were octamethyltetracyclosiloxane and decamethylpentacyclosiloxane; and their content was 0.25%. When the obtained emulsion was held at 25° C., separation was seen after 1 day. The obtained emulsion was re-stirred 13 days after its preparation and then coated on a glass panel and the water fraction was removed to obtain a film. The obtained film was a weak film that was tacky and that lacked elasticity.

Comparative Example 2

50.0 parts of a polydimethylsiloxane endblocked at both molecular chain terminals by the hydroxydimethylsiloxy group and having a viscosity of 2,400 mPa·s was mixed with 1.0 part tetraethoxysilane. This was followed by the addition of 8.0 parts of a 70% aqueous solution of sodium polyoxyethylene (2 mol) lauryl ether sulfate, 1.2 parts of an 85% aqueous solution of a polyoxyethylene branched decyl ether, and 3.0 parts water and mixing and then emulsification using a continuous mixing apparatus. After dilution with 18.8 parts water and 16.5 parts colloidal silica (trade name: Snowtex C, from Nissan Chemical Industries, Ltd., effective component=20%), 1.5 parts of an aqueous solution provided by diluting 0.5 part diethylamine as a pH adjusting agent with 1.0 part water was added, thus producing an oil-in-water silicone emulsion. The average particle size of the obtained emulsion particles was 230 nm; the siloxane oligomers comprising 4 to 5 siloxane units were octamethyltetracyclosiloxane and decamethylpentacyclosiloxane; and their content was 0.12%. When the obtained emulsion was held at 25° C., separation was seen after 1 day. The obtained emulsion was re-stirred 13 days after its preparation and then coated on a glass panel and the water fraction was removed to obtain a film. The obtained film was a weak film that was tacky and that lacked elasticity.

Comparative Example 3

50.0 parts of a polydimethylsiloxane endblocked at both molecular chain terminals by the hydroxydimethylsiloxy group and having a viscosity of 2,400 mPa·s was mixed with 1.0 part tetraethoxysilane. This was followed by the addition of 7.8 parts of an 85% aqueous solution of a polyoxyethylene branched decyl ether and 6.0 parts water and mixing and then emulsification using a continuous mixing apparatus. After dilution with 17.2 parts water and 16.5 parts colloidal silica (trade name: Snowtex C, from Nissan Chemical Industries, Ltd., effective component=20%), 1.5 parts of an aqueous solution provided by diluting 0.5 part diethylamine as a pH adjusting agent with 1.0 part water was added, thus producing an oil-in-water silicone emulsion. The average particle size of the obtained emulsion particles was 180 nm; the siloxane oligomers comprising 4 to 5 siloxane units were octamethyltetracyclosiloxane and decamethylpentacyclosiloxane; and their content was 0.12%. When the obtained emulsion was held at 25° C., separation was seen after 1 day. The obtained emulsion was re-stirred 13 days after its preparation and then coated on a glass panel and the water fraction was removed to obtain a film. The obtained film was a very weak film that was strongly tacky and that lacked elasticity.

INDUSTRIAL APPLICABILITY

The oil-in-water silicone emulsion composition of the present invention has an excellent storage stability notwithstanding its colloidal silica content and, when coated on or impregnated in a substrate followed by removal of the water fraction, forms a cured film that exhibits rubbery elasticity, i.e., an excellent strength. Because of this, the oil-in-water silicone emulsion composition of the present invention is useful for, for example, water-based paints and inks; paper coating agents for use with thermal paper, inkjet paper, and so forth; mold release agents for molds, dies, and rubber; resin coating agents for use on automotive weather stripping, gaskets, rubber hoses, and so forth; fiber treatment agents for use with clothing and air bags; peeling release agents; cosmetics; and so forth.

The invention claimed is:

1. An oil-in-water silicone emulsion composition comprising
   (A) 100 mass parts of a polyorganosiloxane that contains in each molecule at least two silicon-bonded hydroxyl or hydrolyzable groups,
   (B) 0.1 to 200 mass parts of a colloidal silica,
   (C) 1 to 100 mass parts of an ionic emulsifying agent,
   (D) 0.1 to 50 mass parts of a polyoxyethylene-polyoxypropylene copolymer nonionic emulsifying agent, wherein the component (D) polyoxyethylene-polyoxypropylene copolymer nonionic emulsifying agent is a compound represented by the following general formula (1) or general formula (2):

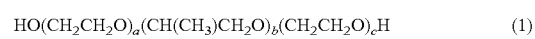

$$HO(CH_2CH_2O)_a(CH(CH_3)CH_2O)_b(CH_2CH_2O)_cH \quad (1)$$

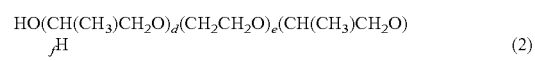

$$HO(CH(CH_3)CH_2O)_d(CH_2CH_2O)_e(CH(CH_3)CH_2O)_fH \quad (2)$$

wherein a, b, c, d, e, and f in general formulas (1) and (2) are the average number of moles of addition of ethylene oxide or propylene oxide and are each independently a number from 1 to 350, and
   (E) 10 to 200 mass parts water.

2. The oil-in-water silicone emulsion composition according to claim 1, wherein the total content of siloxane oligomers comprising 4 to 5 siloxane units is not more than 2 mass %.

3. The oil-in-water silicone emulsion composition according to claim 2, wherein the component (A) polyorganosiloxane is a diorganopolysiloxane endblocked at both molecular chain terminals by the hydroxyl group.

4. The oil-in-water silicone emulsion composition according to claim 3, wherein the viscosity of component (A) at 25° C. is from 50 mPa·s to 2,000,000 mPa·s.

5. The oil-in-water silicone emulsion composition according to claim 1, wherein the component (A) polyorganosiloxane is a diorganopolysiloxane endblocked at both molecular chain terminals by a hydroxyl group.

6. The oil-in-water silicone emulsion composition according to claim 5, wherein the viscosity of component (A) at 25° C. is from 50 mPa·s to 2,000,000 mPa·s.

7. The oil-in-water silicone emulsion composition according to claim 1, further comprising, as a component (F), 0.1 to 50 mass parts of an alkoxysilane or alkoxyalkoxysilane represented by $R_aSiX_{4-a}$ wherein R is an unsubstituted monovalent hydrocarbyl group or a substituted monovalent hydrocarbyl group, X is an alkoxy group or an alkoxyalkoxy group, and a is 0, 1, or 2, or a partial hydrolysis and condensation product of the alkoxysilane or alkoxyalkoxysilane.

8. The oil-in-water silicone emulsion composition according to claim 1, further comprising an amine as a component (G).

9. The oil-in-water silicone emulsion composition according to claim 1, wherein the average particle size of the emulsion particles is not more than 300 nm.

10. A method of producing the oil-in-water silicone emulsion composition according to claim 1, the method comprising the steps of:
carrying out emulsification and dispersion on the (A) polyorganosiloxane that contains in each molecule at least two silicon-bonded hydroxyl or hydrolyzable groups, the (C) ionic emulsifying agent, the (D) polyoxyethylene-polyoxypropylene copolymer nonionic emulsifying agent, and a portion of the (E) water; and
incorporating the (B) colloidal silica and the remainder of the (E) water in the emulsion provided by the preceding step.

11. A method of treating a surface of a substrate, the method comprising carrying out a surface treatment on the surface of the substrate with the oil-in-water silicone emulsion composition according to claim 1.

\* \* \* \* \*